US008685515B2

United States Patent
Oyaizu et al.

(10) Patent No.: US 8,685,515 B2
(45) Date of Patent: Apr. 1, 2014

(54) REFRIGERANT-TRANSPORTING HOSE

(71) Applicant: Tokai Rubber Industries, Ltd., Komaki (JP)

(72) Inventors: Naoki Oyaizu, Komaki (JP); Kazutaka Katayama, Komaki (JP)

(73) Assignee: Tokai Rubber Industries, Ltd., Komaki-shi (JP)

( * ) Notice: Subject to any disclaimer, the term of this patent is extended or adjusted under 35 U.S.C. 154(b) by 0 days.

(21) Appl. No.: 13/664,880

(22) Filed: Oct. 31, 2012

(65) Prior Publication Data
US 2013/0068335 A1 Mar. 21, 2013

Related U.S. Application Data

(63) Continuation of application No. PCT/JP2011/079748, filed on Dec. 21, 2011.

(30) Foreign Application Priority Data

Sep. 15, 2011 (JP) ................................. 2011-202012

(51) Int. Cl.
*B29D 22/00* (2006.01)
*B29D 23/00* (2006.01)
*B32B 1/08* (2006.01)

(52) U.S. Cl.
USPC ....... 428/36.91; 428/35.7; 428/36.9; 138/137

(58) Field of Classification Search
USPC ...................... 428/35.7, 36.9, 36.91; 138/137
See application file for complete search history.

(56) References Cited

U.S. PATENT DOCUMENTS

2009/0098325 A1 4/2009 Uchida et al.

FOREIGN PATENT DOCUMENTS

| JP | 2000-120944 A | 4/2000 |
| JP | 2004-150500 A | 5/2004 |
| WO | 2006/098434 A1 | 9/2006 |
| WO | 2011/018904 A1 | 2/2011 |

OTHER PUBLICATIONS

International Search Report of PCT/JP2011/079748, mailing date Mar. 27, 2012.

*Primary Examiner* — Michael C Miggins
(74) *Attorney, Agent, or Firm* — Westerman, Hattori, Daniels & Adrian, LLP

(57) ABSTRACT

A refrigerant-transporting hose having excellent low-refrigerant permeability, acid resistance, and flexibility includes a tubular resin layer for contacting with a refrigerant, in which the resin layer is formed of a resin composition containing (A) an aliphatic polyamide; (B) a semi-aromatic polyamide; and (C) an elastomer, in which a weight mixing ratio "component (A)/component (B)" between the component (A) and the component (B) is 95/5 to 60/40, and the component (A) and the component (B) are in a compatible state.

10 Claims, 1 Drawing Sheet

REFRIGERANT-TRANSPORTING HOSE

RELATED APPLICATION

This application is a continuation of International Application No. PCT/JP2011/079748, filed on Dec. 21, 2011, which claims priority to Japanese Patent Application No. 2011-202012, filed on Sep. 15, 2011, the entire contents of each of which are hereby incorporated by reference.

BACKGROUND OF THE INVENTION

1. Field of the Invention

The present invention relates to a refrigerant-transporting hose, and more specifically, to a refrigerant-transporting hose for an automobile such as an air conditioner hose or a radiator hose for transporting a refrigerant such as carbon dioxide, a chlorofluorocarbon (R12), an alternative chlorofluorocarbon (such as R-134a as a single refrigerant or Fluid H as a mixed refrigerant), or propane.

2. Description of the Related Art

A fluorine-based refrigerant such as a chlorofluorocarbon (R12) or an alternative chlorofluorocarbon (such as R-134a) has been generally used in a refrigerant-transporting hose to be used in the engine room of an automobile. In recent years, due a tightened regulation on the release of ozone layer-depleting gases, a demand on the refrigerant permeability of the refrigerant hose for an automobile has become stringent. Accordingly, a resin material having high crystallinity such as a polyamide has been used in a resin layer (innermost layer) of the refrigerant-transporting hose intended to contact the refrigerant.

However, it has been known that a refrigerant for an automobile deteriorates owing to long-term use, which generates an acid. The acid decomposes an amide bond of the polyamide. Moreover, the refrigerant-transporting hose such as an air conditioner hose for an automobile is typically used under a high-temperature environment, and hence the chemical deterioration of the polyamide by the acid is apt to be promoted. Accordingly, bending the refrigerant-transporting hose causes a problem such as cracking of the resin layer of the hose. An aliphatic polyamide such as a polyamide 6 which has been conventionally used deteriorates owing to hydrolysis. Accordingly, the aliphatic polyamide is not suited for any application of the refrigerant-transporting hose and hence its improvement has been demanded.

In recent years, a semi-aromatic polyamide such as a polyamide 9T (PA9T) has been attracting attention as a material for the refrigerant-transporting hose because the semi-aromatic polyamide is excellent in low-refrigerant permeability and acid resistance. However, the semi-aromatic polyamide involves the following problem. The semi-aromatic polyamide has high rigidity and thus poor flexibility. To solve this problem of the semi-aromatic polyamide, an approach involving mixing the PA9T as a main component with an aliphatic polyamide has been proposed in the field of a joint for fuel piping (Japanese Laid-open Patent Application No. 2004-150500).

However, even when the resin layer of the refrigerant-transporting hose is produced with the resin composition described in Japanese Laid-open Patent Application No. 2004-150500, which is obtained by mixing the PA9T as a main component with the aliphatic polyamide, the problem concerning flexibility cannot be sufficiently solved and hence the improvement of the flexibility has been demanded.

SUMMARY OF THE INVENTION

The present invention has been made in view of such circumstances, and an objective of the present invention is to provide a refrigerant-transporting hose having excellent low-refrigerant permeability, acid resistance, and flexibility.

In order to achieve this objective, the present invention provides a refrigerant-transporting hose including a tubular resin layer for contacting a refrigerant, in which the resin layer is formed of a resin composition containing the following components (A) to (C), in which a weight mixing ratio "component (A)/component (B)" between the component (A) and the component (B) is 95/5 to 60/40, and the component (A) and the component (B) are in a compatible state:

(A) an aliphatic polyamide;

(B) a semi-aromatic polyamide; and (C) an elastomer.

That is, the inventors of the present invention have made extensive studies with particular emphasis on a resin layer (innermost layer) to be brought into contact with a refrigerant for obtaining a refrigerant-transporting hose having excellent low-refrigerant permeability, acid resistance, and flexibility. As a result, the inventors have found the following. When the weight mixing ratio "component A/component B" between the aliphatic polyamide (component A) and the semi-aromatic polyamide (component B) is set in the range of 95/5 to 60/40, the aliphatic polyamide (component A) and the semi-aromatic polyamide (component B) are brought into a compatible state without adopting a sea-island structure, and hence a good acid resistance performance can be elicited as an effect of the semi-aromatic polyamide (component B). As a result, the deterioration of acid resistance as a drawback of the aliphatic polyamide (component A) hardly occurs, and hence the acid resistance of the resin layer as a whole obtained by using these components is improved. In addition, as a result of further continued studies, the inventors have found that the resin layer (innermost layer) of the refrigerant-transporting hose formed by using a resin composition containing the elastomer (component C) such as an acid-modified ethylene-α-olefin copolymer as well as the predetermined amounts of the aliphatic polyamide (component A) and the semi-aromatic polyamide (component B) has excellent low-refrigerant permeability, acid resistance, and flexibility. Thus, the inventors have reached the present invention.

As described above, the resin layer of the refrigerant-transporting hose of the present invention is formed of a resin layer composition containing the aliphatic polyamide (component A), the semi-aromatic polyamide (component B), and the elastomer (component C), in which the weight mixing ratio "component A/component B" between the component A and the component B is set to fall within the range of 95/5 to 60/40, and the component A and the component B are in a compatible state. Accordingly, the refrigerant-transporting hose of the present invention has excellent low-refrigerant permeability, acid resistance, and flexibility.

In addition, when the content of the elastomer (component C) is in the range of from 5 to 30 parts by weight with respect to 100 parts by weight of the total of the component A and the component B, the flexibility is additionally improved.

Further, when the semi-aromatic polyamide (component B) is a polyamide 9T (PA9T), hydrolysis resistance and the acid resistance are improved.

In particular, when the weight mixing ratio "component A/component B" between the component A and the component B is in the range of from 70/30 to 65/35, a balance among the hydrolysis resistance, the acid resistance, and the flexibility becomes good.

DETAILED DESCRIPTION OF THE PREFERRED EMBODIMENTS

Next, an embodiment of the present invention is described.

Figure 1:
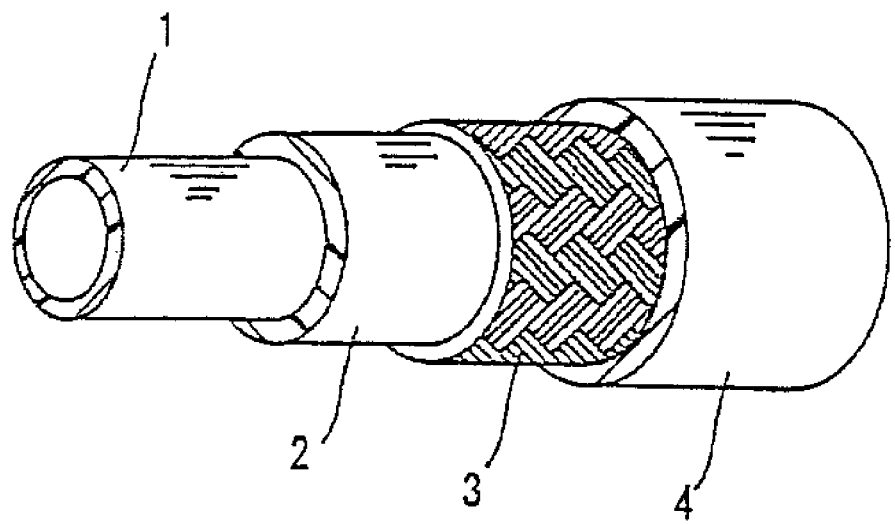
FIG. 1 is a perspective view illustrating the construction of a refrigerant-transporting hose of the present invention.

A refrigerant-transporting hose of the present invention is, for example, such that the outer peripheral surface of a tubular resin layer 1 has an inner surface rubber layer 2 formed thereon and the outer peripheral surface of the layer 2 has an outer surface rubber layer 4 formed thereon through a reinforcing layer 3 as illustrated in FIG. 1. It should be noted that an adhesive may be applied between the respective layers for improving the interlayer adhesiveness of the refrigerant-transporting hose.

In the present invention, the resin layer 1 is formed of a resin composition containing the following components (A) to (C), in which a weight mixing ratio "component (A)/component (B)" between the component (A) and the component (B) is 95/5 to 60/40, and the component (A) and the component (B) are in a compatible state:

(A) an aliphatic polyamide;
(B) a semi-aromatic polyamide; and
(C) an elastomer.

The phrase "the aliphatic polyamide (component A) and the semi-aromatic polyamide (component B) are in a compatible state" as used in the present invention means that the component A and the component B are not in a dispersed state such as a sea-island structure but in a non-dispersed state.

It should be noted that whether the component A and the component B are in a compatible state can be confirmed by thermal analysis based on, for example, differential scanning calorimetry (DSC).

Next, each component of the resin composition constituting the resin layer 1 is specifically described.

<<Resin Layer>>
<Aliphatic Polyamide (Component A)>

Examples of the aliphatic polyamide (component A) include a polyamide 46 (PA46), a polyamide 6 (PA6), a polyamide 66 (PA66), a polyamide 92 (PA92), a polyamide 99 (PA99), a polyamide 610 (PA610), a polyamide 612 (PA612), a polyamide 11 (PA11), a polyamide 912 (PA912), a polyamide 12 (PA12), a copolymer of the polyamide 6 and the polyamide 66 (PA6/66), and a copolymer of the polyamide 6 and the polyamide 12 (PA6/12). One kind of these aliphatic polyamides is used alone, or two or more kinds thereof are used in combination. Of these, PA6 is preferred in terms of low-refrigerant permeability.

<Semi-Aromatic Polyamide (Component B)>

Examples of the semi-aromatic polyamide (component B) include a polyamide 4T (PA4T), a polyamide 6I (PA6I), a polyamide MXD6 (PAMXD6), a polyamide 9T (PA9T), a polyamide 10T (PA10T), a polyamide 11T (PA11T), a polyamide 12T (PA12T), and a polyamide 13T (PA13T). One kind of these semi-aromatic polyamides is used alone, or two or more kinds thereof are used in combination. Of these, PA9T is preferred in terms of hydrolysis resistance and acid resistance.

In the present invention, the weight mixing ratio "component A/component B" between the aliphatic polyamide (component A) and the semi-aromatic polyamide (component B) is 95/5 to 60/40, and the ratio "component A/component B" is preferably 70/30 to 65/35. When the content of the component A is excessively small (the content of the component B is excessively large), the hose has poor flexibility and hence cannot withstand displacement, with the result that its durability deteriorates. When the content of the component A is excessively large (the content of the component B is excessively small), the hose is vulnerable to hydrolysis and hence its acid resistance deteriorates.

<Elastomer (Component C)>

Examples of the elastomer (component C) include an olefin-based elastomer, a styrene-based elastomer, a vinyl chloride-based elastomer, a polyester-based elastomer, a polyurethane-based elastomer, and a polyamide-based elastomer. One kind of these elastomers is used alone, or two or more kinds thereof are used in combination. Of these, an olefin-based elastomer is preferred in terms of flexibility. It should be noted that the various kinds of elastomers (components C) may be subjected to maleic anhydride modification or epoxy modification before their use.

The olefin-based elastomer is, for example, an elastomer obtained by homopolymerization or copolymerization of an olefin or diene monomer such as ethylene, propylene, or butadiene, and specific examples thereof include an ethylene-propylene-diene rubber (EPDM), an ethylene-propylene rubber (EPM), a blend of the EPDM and the EPM, an ethylene-$\alpha$-olefin copolymer, a modified ethylene-$\alpha$-olefin copolymer, and a reactor TPO. Of these, an ethylene-$\alpha$-olefin copolymer and a modified ethylene-$\alpha$-olefin copolymer are preferred in terms of flexibility.

The ethylene-$\alpha$-olefin copolymer is, for example, a copolymer of ethylene and an $\alpha$-olefin such as propylene, 1-butene, 1-pentene, 1-hexene, 1-heptene, 1-octene, 1-nonene, or 1-decene.

In addition, the modified ethylene-$\alpha$-olefin copolymer is, for example, a copolymer obtained by chemically modifying a polymer side chain or polymer terminal of the ethylene-$\alpha$-olefin copolymer with maleic anhydride, silicone (silane), chlorine, an amine, an acrylic compound, or an epoxy compound. A copolymer obtained by subjecting the side chain or the terminal to acid modification with maleic anhydride or the like out of these materials is preferred.

Examples of the styrene-based elastomer include a styrene-butadiene-styrene block copolymer (SBS), a styrene-etylene butylene-styrene block copolymer (SEBS), a styrene-isobutylene block copolymer (SIB), a styrene-isobutylene-styrene block copolymer (SIBS), and a styrene-ethylene propylene-styrene block copolymer (SEPS).

The vinyl chloride-based elastomer is, for example, an elastomer obtained by partially crosslinking part of a product obtained by blending a PVC/rubber with a plasticizer.

The polyester-based elastomer is, for example, an elastomer obtained by the transesterification or polycondensation reaction of dimethyl terephthalate, 1,4-butanediol, or a polytetramethylene ether glycol (PTMG) as a raw material. Specific examples thereof include a polybutylene naphthalate (PBN)-based elastomer and a polybutylene terephthalate (PBT)-based elastomer.

The polyurethane-based elastomer is, for example, a copolymer obtained by the reaction of an isocyanate and a polyol such as a polyether polyol, a polycarbonate polyol, or a polyester polyol.

The polyamide-based elastomer is, for example, a copolymer of a polyether or a polyester and a polyamide such as a polyamide 6 or a polyamide 12. Specific examples thereof include a polyamide 6/polyether copolymer, a polyamide 12/polyether copolymer, and a polyamide 12/polyester copolymer.

The content of the elastomer (component C) is preferably in the range of from 5 to 30 parts by weight, particularly preferably 10 to 15 parts by weight with respect to 100 parts by weight of the total of the component A and the component B. When the content of the component C is excessively small, it is observed that flexibility tends to become poor. When the content of the component C is excessively large, low-refrigerant permeability may be impaired.

It should be noted that in the resin composition to be used in the present invention, the elastomer (component C) is not compatible with the component A or the component B, but the uncrosslinked elastomer (component C) is present in a state of being dispersed in a particulate fashion in a compatible system where the component A and the component B are compatible with each other.

It should be noted that the resin composition constituting the resin layer 1 may be appropriately blended with, for example, a filler, a plasticizer, an age resistor, an antioxidant, a flexible component, a nucleating agent, or a heat-resisting agent in addition to the components A to C as required.

The resin composition can be produced, for example, as described below. That is, the aliphatic polyamide (component A) and the semi-aromatic polyamide (component B) are blended so that their weight mixing ratio may fall within the predetermined range. Next, the elastomer (component C), and as required, any other component are appropriately blended into the mixture, and then the contents are melted and mixed with a biaxial kneader or the like under predetermined conditions (e.g., at 300 to 310° C. for 4 to 5 minutes). Thus, the composition can be prepared.

<<Rubber Layer>>

A main polymer (base material) for each of the inner surface rubber layer 2 and the outer surface rubber layer 4 (hereinafter, both the rubber layers are sometimes simply abbreviated as "rubber layers") is, for example, a butyl-based rubber, an ethylene-propylene-based rubber (ethylene-propylene-diene terpolymer rubber (EPDM) or ethylene-propylene copolymer rubber (EPM)), an acrylonitrile-butadiene rubber (NBR), a chloroprene rubber (CR), a fluororubber (FKM), an epichlorohydrin rubber (ECO), an acrylic rubber, a silicone rubber, a chlorinated polyethylene rubber (CPE), or a urethane rubber. One kind of these main polymers is used alone, or two or more kinds thereof are used in combination. Of these, a butyl-based rubber is preferred in terms of water-blocking property (water barrier property), and an ethylene-propylene-based rubber is preferred in terms of heat resistance.

It should be noted that the structure of the rubber layers in the refrigerant-transporting hose of the present invention is not limited to such two-layer structure (the inner surface rubber layer and the outer surface rubber layer) as illustrated in FIG. 1, and may be a three-layer structure (the inner surface rubber layer, an intermediate rubber layer, and the outer surface rubber layer), or may be a multilayer structure formed of four or more layers.

Specific examples of the combination of the rubber layers include: a two-layer structure (inner surface rubber layer/outer surface rubber layer) such as a structure of "butyl-based rubber layer/EPDM-based rubber layer," "EPDM-based rubber layer/EPDM-based rubber layer," or "EPM-based rubber layer/EPDM-based rubber layer"; and a three-layer structure (inner surface rubber layer/intermediate rubber layer/outer surface rubber layer) such as a structure of "EPM-based rubber layer/EPDM-based rubber layer/EPDM-based rubber layer" or "butyl-based rubber layer/EPDM-based rubber layer/EPDM-based rubber layer." It should be noted that an EPM-based rubber layer may be used as the outer surface rubber layer.

<Butyl-Based Rubber>

For example, a butyl rubber (IIR) or a halogenated butyl rubber is used as the butyl-based rubber. One kind of these rubbers is used alone, or two or more kinds thereof are used in combination. For example, a chlorinated butyl rubber (Cl-IIR) or a brominated butyl rubber (Br-IIR) is used as the halogenated butyl rubber.

<Ethylene-Propylene-Based Rubber>

Examples of the ethylene-propylene-based rubber include an ethylene-propylene-diene terpolymer rubber (EPDM) and an ethylene-propylene copolymer rubber (EPM).

A diene-based monomer (third component) in the EPDM is preferably a diene-based monomer having 5 to 20 carbon atoms. Specific examples thereof include 1,4-pentadiene, 1,4-hexadiene, 1,5-hexadiene, 2,5-dimethyl-1,5-hexadiene, 1,4-octadiene, 1,4-cyclohexadiene, cyclooctadiene, dicyclopentadiene (DCP), 5-ethylidene-2-norbornene (ENB), 5-butylidene-2-norbornene, 2-methallyl-5-norbornene, and 2-isopropenyl-5-norbornene. Of these diene-based monomers (third components), dicyclopentadiene (DCP) and 5-ethylidene-2-norbornene (ENB) are preferred.

It should be noted that, in addition to the main polymer such as the butyl-based rubber, a resin crosslinking agent, a resorcinol-based compound (adhesive component), a melamine-based compound (adhesive component), carbon black, a filler, a softening agent, a tackifies, a processing aid, and the like can be appropriately blended in a material for a rubber layer (rubber composition) for forming each of the rubber layers 2, 4 as required.

<Resin Crosslinking Agent>

The resin crosslinking agent is, for example, a formaldehyde condensate of an alkyl phenol. The resin crosslinking agent is specifically, for example, an alkyl phenol-formaldehyde condensate (TACKIROL 201 manufactured by TAOKA CHEMICAL COMPANY, LIMITED).

The content of the resin crosslinking agent is preferably 20 to 40 parts by weight with respect to 100 parts by weight of the main polymer such as the butyl-based rubber.

<Resorcinol-Based Compound (Adhesive Component)>

The resorcinol-based compound is preferably a compound that serves mainly as an adhesive, and examples thereof include a modified resorcin-formaldehyde resin, resorcin, and a resorcin-formaldehyde (RF) resin. One kind of these materials is used alone, or two or more kinds thereof are used in combination. Of these, a modified resorcin-formaldehyde resin is suitably used in terms of transpiration property and compatibility with a rubber.

Examples of the modified resorcin-formaldehyde resin include resins represented by the following general formulae (1) to (3). One kind of these resins is used alone, or two or more kinds thereof are used in combination. Of these, the resin represented by the general formula (1) is particularly preferred.

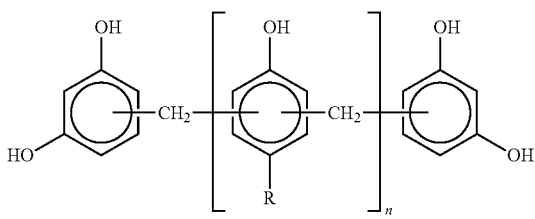

(1)

(In the formula, R represents a hydrocarbon group and n represents an integer.)

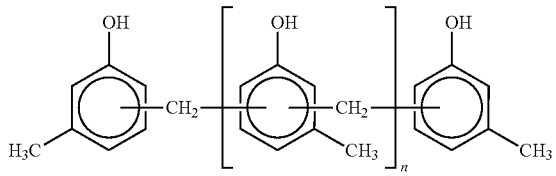

(2)

(In the formula, n represents an integer.)

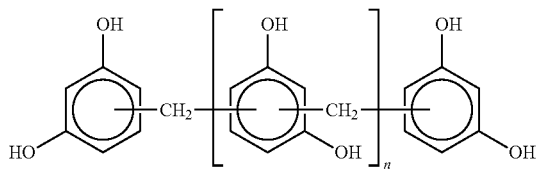

(3)

(In the formula, n represents an integer.)

The content of the resorcinol-based compound is preferably in the range of 0.1 to 10 parts by weight, particularly preferably 0.5 to 5 parts by weight with respect to 100 parts by weight of the main polymer such as the butyl-based rubber.

<Melamine-Based Compound (Adhesive Component)>

Examples of the melamine-based compound include a methylated product of a formaldehyde-melamine polymer and hexamethylenetetramine. One kind of these compounds is used alone, or two or more kinds thereof are used in combination. Each of these compounds decomposes under heating upon crosslinking to supply formaldehyde to a system. Of these, a methylated product of a formaldehyde-melamine polymer is preferred because of its low volatility and excellent compatibility with a rubber.

The methylated product of the formaldehyde-melamine polymer is preferably, for example, a compound represented by the following general formula (4). A mixture of 43 to 44 wt % of such a compound that n in the general formula (4) equals 1, 27 to 30 wt % of such a compound that n therein equals 2, and 26 to 30 wt % of such a compound that n therein equals 3 is particularly preferred.

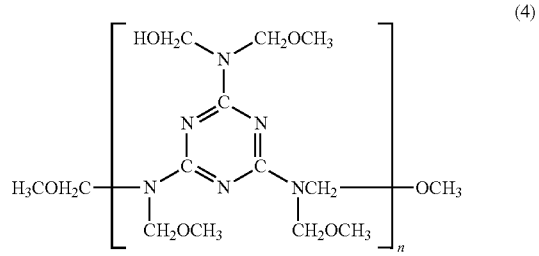

(4)

(In the formula, n represents an integer.)

The content of the melamine-based compound is preferably 5 parts by weight or less with respect to 100 parts by weight of the main polymer such as the butyl-based rubber.

Here, a mixing ratio between the resorcinol-based compound and the melamine-based compound is preferably in the range of from 1:0.5 to 1:2, particularly preferably 1:0.77 to 1:1.5 in terms of a weight ratio.

<Carbon Black>

Examples of the carbon black include SAF-, ISAF-, HAF-, MAF-, FEF-, GPF-, SRF-, FT-, and MT-grade carbon blacks. One kind of these carbon blacks is used alone, or two or more kinds thereof are used in combination.

The content of the carbon black is preferably in the range of from 30 to 150 parts by weight with respect to 100 parts by weight of the main polymer such as the butyl-based rubber.

<Filler>

Examples of the filler include inorganic compounds derived from minerals such as talc and mica. One kind of these compounds is used alone, or two or more kinds thereof are used in combination.

The content of the filler is preferably in the range of from 1 to 200 parts by weight with respect to 100 parts by weight of the main polymer such as the butyl-based rubber.

<Softening Agent>

Examples of the softening agent include: petroleum-based softening agents such as process oil, lubricating oil, paraffin, liquid paraffin, petroleum asphalt, and vaseline; fatty oil-based softening agents such as castor oil, linseed oil, rapeseed oil, and coconut oil; waxes such as tall oil, factice, bees wax, carnauba wax, and lanolin; linoleic acid; palmitic acid; stearic acid; and lauric acid. One kind of these softening agents is used alone, or two or more kinds thereof are used in combination.

The content of the softening agent is preferably 40 parts by weight or less with respect to 100 parts by weight of the main polymer such as the butyl-based rubber.

The material for a rubber layer (rubber composition) can be prepared by blending the respective components and kneading the mixture with a roll or the like.

<<Reinforcing Layer>>

A reinforcing wire material such as a polyethylene terephthalate (PET), a polyethylene naphthalate (PEN), an aramid, a polyamide, a vinylon, a rayon, or a metal wire can be used as a material for forming the reinforcing layer 3. The reinforcing layer 3 can be produced by plaiting the reinforcing wire material by spiral plaiting, braid plaiting, knit plaiting, or the like.

Next, a method of producing the refrigerant-transporting hose of the present invention is described. That is, first, the resin composition using the components A to C as essential components is prepared. In addition, the main polymer such as the butyl-based rubber is blended with any other component at a predetermined ratio, and then the contents are kneaded. Thus, the materials for rubber layers (the material for the inner surface rubber layer and the material for the outer surface rubber layer) are prepared. Next, the tubular resin layer 1 is formed by extruding the resin composition into a hose shape onto a mandrel prepared in advance. It should be noted that the mandrel may be omitted as required. Next, the inner surface rubber layer 2 is formed by extruding the material for the inner surface rubber layer onto the outer peripheral surface of the resin layer 1. After that, the reinforcing layer 3 is formed by subjecting the outer peripheral surface of the layer 2 to, for example, braid plaiting with a reinforcing wire material such as a PET yarn. Further, the outer surface rubber layer 4 is formed by extruding the material for the outer surface rubber layer onto the outer peripheral surface of the reinforcing layer 3. After that, vulcanization is performed under a predetermined condition. Thus, the refrigerant-transporting hose obtained by sequentially forming, on the outer peripheral surface of the resin layer 1, the inner surface rubber layer 2, the reinforcing layer 3, and the outer surface rubber layer 4 (see FIG. 1) can be produced.

In the refrigerant-transporting hose of the present invention, a hose inner diameter is preferably in the range of from 5 to 40 mm. In addition, the thickness of the resin layer 1 is preferably in the range of from 0.02 to 2 mm, particularly preferably 0.15 to 0.2 mm, the thickness of the inner surface rubber layer 2 is preferably in the range of from 0.5 to 5 mm, particularly preferably 1.5 to 2 mm, and the thickness of the outer surface rubber layer 4 is preferably in the range of from 0.5 to 2 mm, particularly preferably 1 to 1.5 mm.

It should be noted that the structure of the refrigerant-transporting hose of the present invention is not limited to the structure illustrated in FIG. 1, and may be a structure having three or more rubber layers such as a layer structure "resin layer/inner surface rubber layer/reinforcing layer/intermediate rubber layer/reinforcing layer/outer surface rubber layer" as described in the foregoing.

EXAMPLES

Next, examples are described together with comparative examples, provided that the present invention is not limited to these examples.

First, the following materials were prepared prior to the examples and the comparative examples.

<Aliphatic Polyamide (Component A)>
PA6 (Nylon 6 1030B manufactured by UBE INDUSTRIES, LTD.)
<Semi-Aromatic Polyamide (Component B)>
PA6T (VESTAMID M-1000 manufactured by Daicel-Evonik Ltd.)
PA9T (GENESTAR N1001A manufactured by KURARAY CO., LTD.)
<Elastomer (i) (Component C)>
Ethylene-α-olefin copolymer (TAFMER A-4085 manufactured by Mitsui Chemicals, Inc.)
<Elastomer (ii) (Component C)>
Maleic anhydride-modified ethylene-α-olefin copolymer (TAFMER MH7020 manufactured by Mitsui Chemicals, Inc.)

Example 1

<Preparation of Resin Composition>
A PA6 (component A) and a PA9T (component B) were blended at ratios shown in Table 1 below, and then the mixture was kneaded with a biaxial kneader (manufactured by JSW) at 300° C. for 1 to 2 minutes. Next, the mixture was blended with an elastomer (i) (component C) at a ratio shown in the table, and then the contents were melted and mixed with the biaxial kneader (manufactured by JSW) at 300° C. for 2 to 3 minutes. Thus, a resin composition was prepared.

<Preparation of Butyl Rubber Composition>
100 Parts by weight of a chlorinated butyl rubber (Cl-IIR) (Butyl HT1066 manufactured by JSR Corporation), 1 part by weight of stearic acid (BEADS STEARIC ACID SAKURA manufactured by Kao Corporation), 20 parts by weight of an FEF-grade carbon black (SEAST SO manufactured by Tokai Carbon Co., Ltd.), 100 parts by weight of talc (MICRO ACE P-2 manufactured by NIPPON TALC Co., Ltd.), 10 parts by weight of a naphthene oil as a softening agent (DIANAPROCESS NM-280 manufactured by Idemitsu Kosan Co., Ltd.), 3 parts by weight of zinc oxide (Zinc Oxide Type 1 manufactured by Sakai Chemical Industry Co., Ltd.), and 10 parts by weight of a resin vulcanizing agent (TACKIROL 201-35 manufactured by TAOKA CHEMICAL COMPANY, LIMITED) were blended, and then the mixture was kneaded with a Banbury mixer (manufactured by KOBE STEEL, LTD.) and a roll (manufactured by Nippon Roll MFG. Co., Ltd.). Thus, a butyl rubber composition was prepared.

<Preparation of EPDM Composition>
100 Parts by weight of an EPDM (ESPRENE 532T manufactured by Sumitomo Chemical Co., Ltd.), 1 part by weight of stearic acid (LUNAC S30 manufactured by Kao Corporation), 5 parts by weight of zinc oxide (Zinc Oxide Type 2 manufactured by MITSUI MINING & SMELTING CO., LTD.), 100 parts by weight of an FEF-grade carbon black (SEAST SO manufactured by Tokai Carbon Co., Ltd.), 70 parts by weight of a naphthene oil as a softening agent (DIANAPROCESS NM-280 manufactured by Idemitsu Kosan Co., Ltd.), 1 part by weight of a thiuram-based vulcanization accelerator (SANCELER TT-G manufactured by SANSHIN CHEMICAL INDUSTRY CO., LTD.), 1 part by weight of a dithiocarbamate-based vulcanization accelerator (SANCELER BZ-G manufactured by SANSHIN CHEMICAL INDUSTRY CO., LTD.), and 1 part by weight of a vulcanizing agent (sulfur) (SULFUR-PTC manufactured by DAITO SANGYO CO., LTD.) were blended, and then the mixture was kneaded with a Banbury mixer (manufactured by KOBE STEEL, LTD.) and a roll (manufactured by Nippon Roll MFG. Co., Ltd.). Thus, an ethylene-propylene-based rubber composition was prepared.

<Production of Hose>
A tubular resin layer was formed by melt-extruding the resin composition onto a mandrel (having an outer diameter of 12 mm) made of a TPX (manufacturedbyMitsui Chemicals, Inc.) prepared in advance. Next, an inner surface rubber layer was formed by extruding the butyl rubber composition onto the outer peripheral surface of the resin layer. Subsequently, a reinforcing layer was formed by subjecting the outer peripheral surface of the inner surface rubber layer to braid plaiting with a PET yarn. After that, an outer surface rubber layer was formed by extruding the EPDM composition onto the outer peripheral surface of the reinforcing layer. Next, the resultant was vulcanized (170° C.×30 minutes). After that, the mandrel was taken out and then the continuous, laminated hose was cut into a desired length. Thus, a hose (having an inner diameter of 12 mm) obtained by sequentially forming the resin layer (having a thickness of 0.15 mm), the inner surface rubber layer (having a thickness of 2.0 mm), the reinforcing layer, and the outer surface rubber layer (having a thickness of 1.0 mm) was produced.

Examples 2 to 9 and Comparative Examples 1 to 3

Resin compositions were produced in the same manner as in Example 1 except that the blending ratios of the respective components were changed to ratios shown in Table 1 below. Then, hoses were produced in the same manner as in Example 1 except that these resin compositions were used.

TABLE 1

| | Example | | | | | | | | | Comparative Example (Part(s) by weight) | | |
|---|---|---|---|---|---|---|---|---|---|---|---|---|
| | 1 | 2 | 3 | 4 | 5 | 6 | 7 | 8 | 9 | 1 | 2 | 3 |
| PA6(A) | 95 | 95 | 80 | 70 | 65 | 60 | 60 | 60 | 70 | — | 50 | 100 |
| PA6T(B) | — | — | — | — | — | — | — | — | 30 | — | — | — |
| PA9T(B) | 5 | 5 | 20 | 30 | 35 | 40 | 40 | 40 | — | 100 | 50 | — |
| Elastomer (i) | 5 | — | — | — | — | — | — | 30 | — | — | 15 | — |
| Elastomer (ii) | — | 30 | 15 | 15 | 15 | 5 | 15 | — | 30 | — | — | — |
| Compatible state | ○ | ○ | ○ | ○ | ○ | ○ | ○ | ○ | ○ | — | x | — |
| Flexibility | ○ | ○ | ○ | ○ | ○ | ○ | ○ | ○ | ○ | x | x | ○ |
| Tension test | | | | | | | | | | | | |
| TB (MPa) | 52 | 50 | 59 | 69 | 69 | 71 | 70 | 64 | 65 | 85 | 70 | 56 |
| EB (%) | 360 | 260 | 330 | 320 | 300 | 330 | 290 | 270 | 300 | 250 | 300 | 350 |
| Refrigerant-refrigerating machine oil resistance | | | | | | | | | | | | |
| TB (MPa) | 25 | 22 | 35 | 32 | 35 | 40 | 38 | 35 | 39 | 60 | 48 | 24 |
| EB (%) | 110 | 150 | 110 | 110 | 180 | 180 | 190 | 210 | 110 | 150 | 200 | 10 |
| Durability (bending fatigue resistance) | ○ | ○ | ○ | ○ | ○ | ○ | ○ | ○ | ○ | x | x | ○ |

The hoses of the examples and the comparative examples thus obtained were evaluated for respective characteristics in accordance with the following criteria. Table 1 above shows the results together.

<Compatible State>

A compatible state between the aliphatic polyamide (component A) and the semi-aromatic polyamide (component B) was observed for the resin composition of each hose. That is, the resin composition was subjected to thermal analysis with a DSC (DSC-60 manufactured by Shimadzu Corporation). The resin composition was evaluated as ○ (compatible) when an endothermic peak resulting from a melting point was a single peak, and was evaluated as x (incompatible) when the peak was not a single peak. It should be noted that the measurement was performed under the following conditions. In nitrogen, the temperature of the resin composition was increased from normal temperature to 300° C. at 10° C./min. After that, the temperature was cooled to 30° C. and then increased to 300° C. again at 10° C./min.

<Flexibility>

A hose was wound around a tubular cylinder (mandrel) having a diameter of 200 mm and was then evaluated for its flexibility on the basis of the extent to which the hose was wound. The hose was evaluated as ○ when the resin layer of the hose did not kink (buckle), and was evaluated as x when the resin layer kinked (buckled).

<Physical Properties at Time of Normal State>

Each of the resin compositions of the examples and the comparative examples was extruded (at 290 to 300° C.) with a single-layer extruder having a T-die head to provide a resin film. The tensile strength (TB: tensile strength at break (MPa)) and elongation (EB: elongation at break (%)) of the resin film were measured in conformity with JIS K6251. It should be noted that the tensile strength (TB) is preferably 49 MPa or more and the elongation (EB) is preferably 260% or more.

<Refrigerant-Refrigerating Machine Oil Resistance>

Each of the resin compositions of the examples and the comparative examples was extruded (at 290 to 300° C.) with a single-layer extruder having a T-die head to provide a resin film. 30 grams of a refrigerant (HFC-134a), 50 g of a polyalkylene glycol (PAG)-based refrigerating machine oil (Daphne Hermetic Oil NF manufactured by Idemitsu Kosan Co., Ltd.), and 10,000 ppm of water (distilled water) were sealed in a 300-cc pressure vessel having pressure resistance, and then the resin film was aged with the pressure vessel at a predetermined temperature for a predetermined time period (150° C.×96 hours). Next, the tensile strength (TB: tensile strength at break (MPa)) and elongation (EB: elongation at break (%)) of the resin film were measured in conformity with JIS K6251. It should be noted that the TB is preferably 22 MPa or more and the EB is preferably 100% or more.

<Durability (Bending Fatigue Resistance)>

Figure 2:
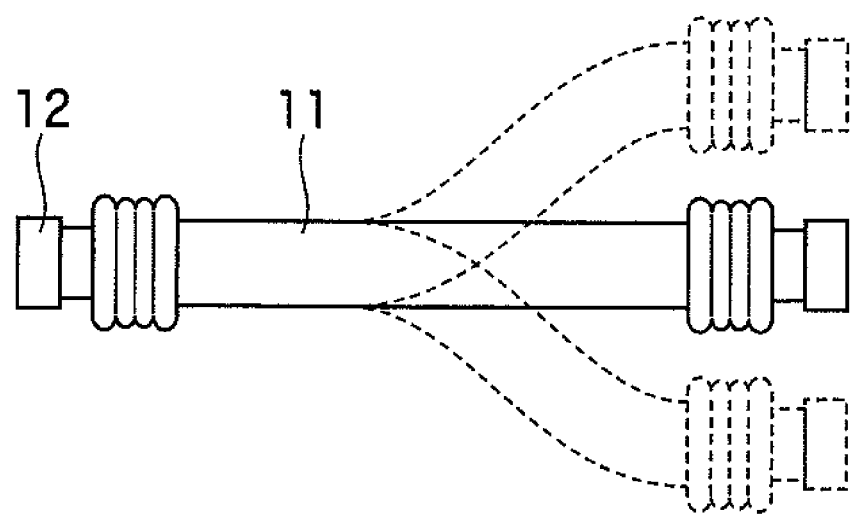
FIG. 2 is an explanatory diagram illustrating the content of a whip test.

Both ends of a hose having a length of about 300 mm were caulked with aluminum fittings. 10 grams of a refrigerant (HFC-134a), 30 g of a polyalkylene glycol (PAG)-based refrigerating machine oil (DAPHNE HERMETIC OIL NF manufactured by Idemitsu Kosan Co., Ltd.), and 10,000 ppm of water (distilled water) were sealed in the hose, and then the hose was aged at a predetermined temperature for a predetermined time period (150° C.×96 hours). Next, a whip test was performed as described below for evaluating the durability (bending fatigue resistance) of each hose. That is, as illustrated in FIG. 2, one end 12 of a hose 11 having a test length (hose length) of 300 mm was fixed, and then the whip test was performed 1,000,000 times under the following conditions: an elliptical vibration having a vertical amplitude of 9 mm and a horizontal amplitude of 18 mm, a pressure of 3.5 MPa, and a test temperature of 130° C. The hose was evaluated as x when the resin layer cracked, and was evaluated as ○ when the resin layer did not crack.

The foregoing results showed that each of the products of the examples had excellent low-refrigerant permeability, acid resistance, flexibility, and durability.

In contrast, the product of Comparative Example 1 had poor flexibility and durability because the resin layer was formed only of the PA9T (single material).

The product of Comparative Example 2 had poor flexibility and durability because the mixing ratio of the PA9T was excessively high (the mixing ratio of the PA6 was excessively low).

The product of Comparative Example 3 had poor refrigerant-refrigerating machine oil resistance because the resin layer was formed only of the PA6 (single material).

Although only the PA6 was used as the aliphatic polyamide (component A) in each of the resin layers of the examples, the inventors of the present invention have confirmed through experiments that results substantially comparable to those of the examples are obtained even when the aliphatic polyamide (component A) except the PA6 is used.

It should be noted that the above-mentioned examples, which have shown specific embodiments in the present invention, are merely examples and should not be construed as being limitative. In addition, all modifications belonging to the scope equivalent to the scope of the claims fall within the scope of the present invention.

The refrigerant-transporting hose of the present invention is used as, for example, the air conditioner hose or radiator hose of an automobile. However, the hose can be used not only in the automobile but also in, for example, any other transportation machine (e.g., an industrial transportation vehicle such as an airplane, a fork lift, a digger, or a crane, or a railway vehicle).

What is claimed is:

1. A refrigerant-transporting hose, comprising a tubular resin layer for contacting a refrigerant, wherein the resin layer is formed of a resin composition containing an aliphatic polyamide as component (A); a semi-aromatic polyamide as component (B); and an elastomer as component (C), wherein a weight mixing ratio of the component (A) relative to the component (B) is 95/5 to 60/40, and the component (A) and the component (B) are in a compatible state.

2. A refrigerant-transporting hose according to claim 1, wherein a content of the component (C) is in a range of from 5 to 30 parts by weight with respect to 100 parts by weight of a total of the component (A) and the component (B).

3. A refrigerant-transporting hose according to claim 1, wherein the component (B) comprises a polyamide 9T (PA9T).

4. A refrigerant-transporting hose according to claim 1, wherein the component (C) comprises an olefin-based elastomer formed of at least one of an ethylene-α-olefin copolymer and an acid-modified ethylene-α-olefin copolymer.

5. A refrigerant-transporting hose according to claim 1, wherein the weight mixing ratio of the component (A) relative to the component (B) is 70/30 to 65/35.

6. A refrigerant-transporting hose according to claim 1, further comprising:
   an inner surface rubber layer formed on an outer peripheral surface of the resin layer,
   a reinforcing layer formed on an outer peripheral surface of the inner surface rubber layer, and
   an outer surface rubber layer formed on an outer peripheral surface of the reinforcing layer.

7. A refrigerant-transporting hose according to claim 6, wherein a main polymer of each of the inner surface rubber layer and the outer surface rubber layer is at least one selected from the group consisting of a butyl-based rubber, ethylene-propylene-based rubbers (an ethylene-propylene-diene terpolymer rubber (EPDM) and an ethylene-propylene copolymer rubber (EPM)), an acrylonitrile-butadiene rubber (NBR), a chloroprene rubber (CR), a fluororubber (FKM), an epichlorohydrin rubber (ECO), an acrylic rubber, a silicone rubber, a chlorinated polyethylene rubber (CPE), and a urethane rubber.

8. A refrigerant-transporting hose according to claim 6, wherein a main polymer of the inner surface rubber layer is a butyl-based rubber.

9. A refrigerant-transporting hose according to claim 6, wherein a main polymer of the outer surface rubber layer is an ethylene-propylene-based rubber.

10. A refrigerant-transporting hose according to claim 6, wherein a main polymer of the inner surface rubber layer is a butyl-based rubber and a main polymer of the outer surface rubber layer is an ethylene-propylene-based rubber.

* * * * *